United States Patent
Bobier-Tiu

(10) Patent No.: US 12,060,068 B2
(45) Date of Patent: Aug. 13, 2024

(54) LOW SPEED CORNERING STIFFNESS DERATE USING A DYNAMIC VEHICLE MODEL

(71) Applicant: TOYOTA RESEARCH INSTITUTE, INC., Los Altos, CA (US)

(72) Inventor: Carrie G. Bobier-Tiu, Los Altos, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 17/732,369

(22) Filed: Apr. 28, 2022

(65) Prior Publication Data

US 2023/0347909 A1    Nov. 2, 2023

(51) Int. Cl.
*B60W 40/101*     (2012.01)
*B60W 40/105*     (2012.01)

(52) U.S. Cl.
CPC ........ *B60W 40/101* (2013.01); *B60W 40/105* (2013.01); *B60W 2520/12* (2013.01); *B60W 2520/263* (2013.01); *B60W 2520/266* (2013.01); *B60W 2552/30* (2020.02)

(58) Field of Classification Search
CPC ............. B60W 40/101; B60W 40/105; B60W 2552/30; B60W 2520/12; B60W 2520/263; B60W 2520/266
USPC .......................................................... 701/70
See application file for complete search history.

(56) References Cited

U.S. PATENT DOCUMENTS

| | | | | |
|---|---|---|---|---|
| 6,131,054 A | * | 10/2000 | Shibahata | B60K 17/04 701/72 |
| 6,301,534 B1 | * | 10/2001 | McDermott, Jr. | B62D 5/001 701/41 |
| 7,258,149 B2 | * | 8/2007 | Ishikawa | B60C 9/22 152/533 |
| 7,734,406 B1 | * | 6/2010 | Oppenheimer | B60T 8/885 180/443 |
| 9,731,755 B1 | * | 8/2017 | Moshchuk | B62D 6/04 |
| 11,054,828 B2 | * | 7/2021 | Fernandez Guzmann | G05D 1/0212 |

(Continued)

FOREIGN PATENT DOCUMENTS

| | | | | |
|---|---|---|---|---|
| CN | 101670834 A | * | 3/2010 | B60Q 9/00 |
| WO | WO-2009105804 A1 | * | 9/2009 | B66F 9/12 |
| WO | WO-2022037510 A1 | * | 2/2022 | B60Q 9/00 |

OTHER PUBLICATIONS

Liang et al., "Control for Four-Wheel Independently Driven Electric Vehicles to Improve Steering Performance Using H∞ and Moore-Penrose Theory," Proceedings of the Institution of Mechanical Engineers Part D Journal of Automobile Engineering, 233(6):1466-1479, Mar. 2018 (https://doi.org/10.1177/0954407018761724).

Kati et al., "Robust Lateral Control of Long-Combination Vehicles under Moments of Inertia and Tyre Cornering Stiffness Uncertainties," Vehicle System Dynamics, 57(12):1847-1873, Nov. 29, 2018 (https://doi.org/10.1080/00423114.2018.1552363).

(Continued)

*Primary Examiner* — Richard A Goldman
(74) *Attorney, Agent, or Firm* — SHEPPARD, MULLIN, RICHTER & HAMPTON LLP; Daniel N. Yannuzzi

(57) ABSTRACT

Systems and methods are provided for predicting a vehicle's motion. It is determined that speed of the vehicle is below a threshold speed. A derated tire cornering stiffness value that is less than a nominal cornering stiffness value is obtained. The vehicle's motion is predicted based on a dynamic model using the derated tire corning stiffness value.

20 Claims, 5 Drawing Sheets

(56) References Cited

U.S. PATENT DOCUMENTS

| | | | |
|---|---|---|---|
| 2006/0190150 A1* | 8/2006 | Milot | B60T 8/1725 701/1 |
| 2008/0086248 A1* | 4/2008 | Lu | B60T 8/17552 701/41 |
| 2009/0024269 A1* | 1/2009 | Shorten | G01M 1/122 701/31.4 |
| 2010/0268422 A1* | 10/2010 | Blommer | B62D 5/0472 701/44 |
| 2012/0109458 A1* | 5/2012 | Sidlosky | B60T 8/17551 701/41 |
| 2015/0158528 A1* | 6/2015 | Moshchuk | B62D 15/0265 701/41 |
| 2022/0242422 A1* | 8/2022 | Thompson | B60W 50/0097 |
| 2022/0289208 A1* | 9/2022 | Hattori | B60W 30/04 |
| 2022/0306117 A1* | 9/2022 | Laine | B60T 8/1725 |
| 2022/0340123 A1* | 10/2022 | Kameoka | B60W 40/06 |
| 2023/0219561 A1* | 7/2023 | El-Shaer | B60W 40/101 701/23 |
| 2023/0339478 A1* | 10/2023 | Koehler | B60W 40/114 |
| 2023/0347909 A1* | 11/2023 | Bobier-Tiu | B60W 40/101 |

OTHER PUBLICATIONS

Liu et al., "Sideslip Angle Estimation of Ground Vehicles: A Comparative Study," IET Control Theory & Applications, 14(20):3490-3505, Mar. 12, 2021 (https://doi.org/10.1049/iet-cta.2020.0516).

Vaseur et al., "Robust Vehicle State and Tire Force Estimation: Highlights on Effects of Road Angles and Sensor Performance," 2021 IEEE Intelligent Vehicles Symposium (IV), pp. 28-33, Jul. 12, 2021 (https://doi.org/10.1109/IV48863.2021.9575640).

Vaskov et al., "Cornering Stiffness Adaptive, Stochastic Nonlinear Model Predictive Control for Vehicles," American Control Conference (ACC), Jun. 4, 2021, 7 pages (https://merl.com/publications/docs/TR2021-056.pdf).

Xu et al., Model Predictive Control for Lane Keeping System in Autonomous Vehicle, 7th International Conference on Power Electronics Systems and Applications—Smart Mobility, Power Transfer & Security (PESA), Dec. 2017, 5 pages (https://doi.org/10.1109/PESA.2017.8277758).

* cited by examiner

LOW SPEED CORNERING STIFFNESS DERATE USING A DYNAMIC VEHICLE MODEL

TECHNICAL FIELD

The present disclosure relates generally to predicting motion of a vehicle, and in particular, some implementations may relate to improving vehicle motion prediction by a dynamic model by derating tire cornering stiffness used by the model as the vehicle approaches lower speeds.

DESCRIPTION OF RELATED ART

The modeling of the motion of a vehicle may be accomplished utilizing either a kinematic model or a dynamic model. Kinetic models predict a vehicle's motion based on a mathematical relationship between various parameters of the movement (e.g., position, velocity, acceleration), without considering the forces that affect the motion. Dynamic models, on the other hand, predict a vehicle's motion taking into account longitudinal and lateral tire forces. For the most part, the dynamic model is the preferred model to model the motion of the vehicle as the dynamic model has more parameters and considers forces between the tires and the ground that actually affect the motion.

The dynamic model is fairly accurate at higher speeds. However, at lower speeds (e.g., approximately 5 mph or less) the dynamic model becomes less accurate. This can be partially explained because the dynamic model utilizes velocity and, as velocity approaches zero, calculations with the dynamic model become more inaccurate.

BRIEF SUMMARY OF THE DISCLOSURE

Various embodiments of the disclosed technology provide an improvement over prior art vehicle motion prediction based on dynamic model by derating the tire cornering stiffness value used by the model as the vehicle approaches lower speeds. It has been observed that this derating of the tire cornering stiffness value results in the dynamic model becoming more accurate at lower speeds (e.g., 5 mph or less).

According to various embodiments of the disclosed technology, a vehicle motion prediction system is disclosed. The vehicle motion prediction system includes a vehicle speed sensor configured to measure a vehicle's speed. The vehicle motion prediction system can further include a processor configured to receive receive a signal indicative of the speed from the vehicle speed sensor, determine the speed from the signal, obtain a derated tire cornering stiffness value that is less than a nominal cornering stiffness value if the speed is below a threshold speed, and predict the vehicle's motion based on a dynamic model using the derated tire cornering stiffness value.

According to various embodiments of the disclosed technology, a method of predicting a vehicle's motion is disclosed. The method includes receiving a signal indicative of the vehicle's speed from a vehicle speed sensor, determining the speed from the signal, determining that the speed is below a threshold speed, obtaining a derated tire cornering stiffness value that is less than a nominal cornering stiffness value, an predicting the vehicle's motion based on a dynamic model using the derated tire cornering stiffness value.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide an improved vehicle motion prediction based on a dynamic model using derated tire cornering stiffness.

Figure 1:
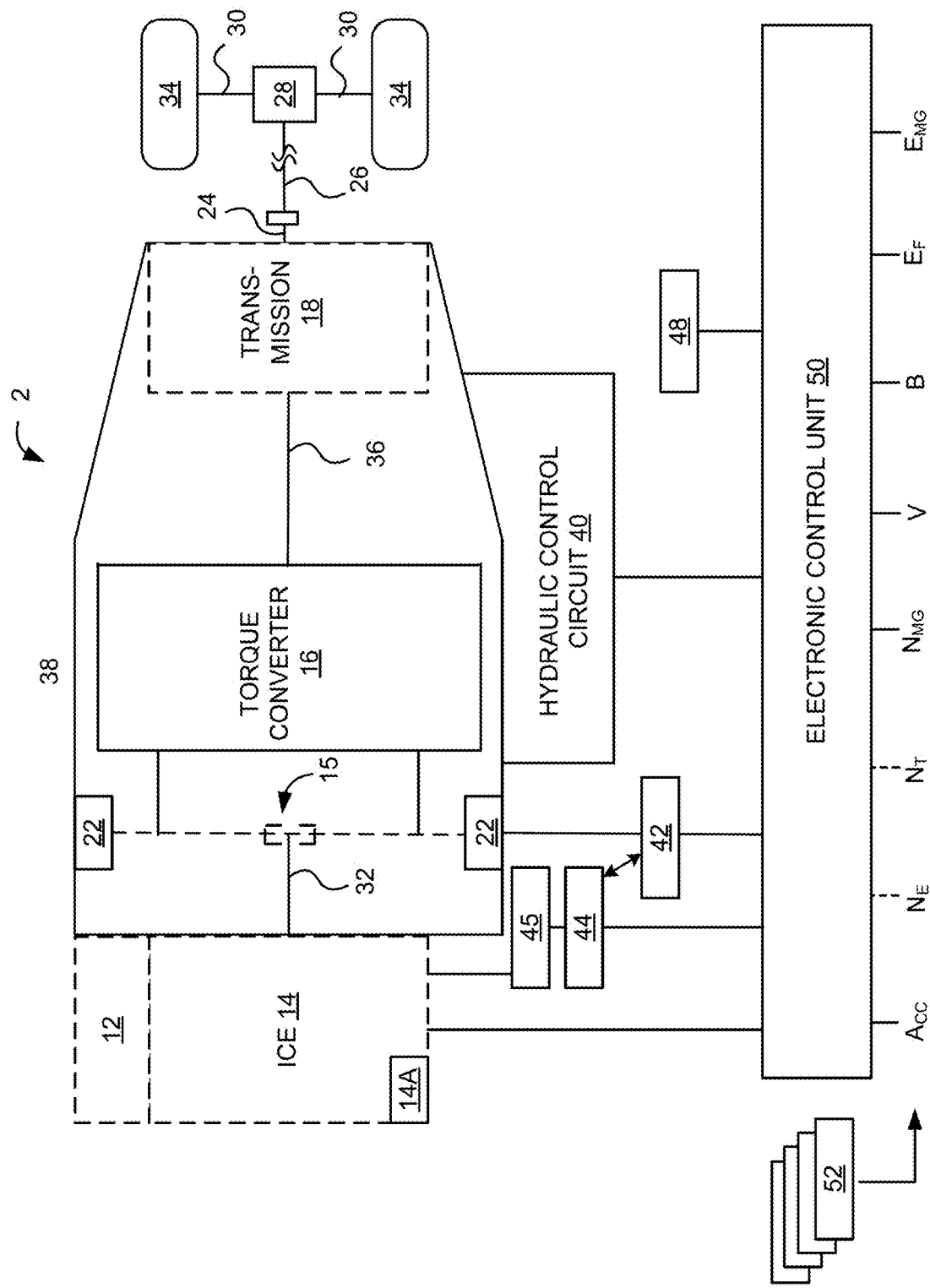
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for an improved vehicle motion prediction by a dynamic model can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
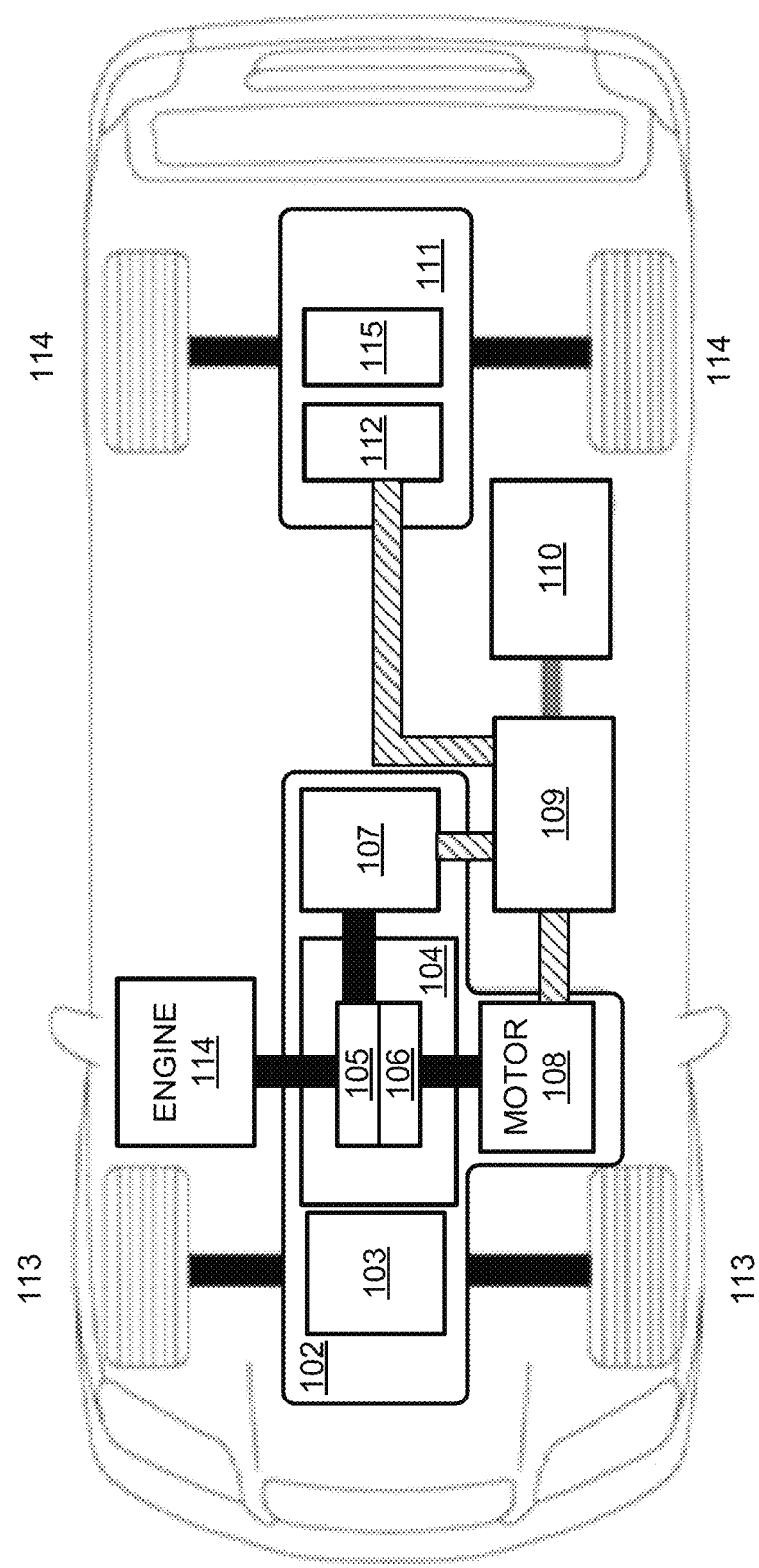
FIG. 2 illustrates an example of an all-wheel drive hybrid vehicle with which embodiments of the systems and methods disclosed herein may be implemented.

FIG. 2 is another example of a vehicle with which systems and methods for an improved vehicle motion prediction by a dynamic model using derated tire cornering stiffness at lower speeds be implemented. The example illustrated in FIG. 2 is also that of a hybrid vehicle drive system of a vehicle 110 that may also include an engine 114 (e.g., engine 14) and one or more electric motors 108, 112 (e.g., motors 22) as sources of motive power. In this example, a hybrid transaxle 102 includes front differential 103, a compound gear unit 104, a motor 108, and a generator 107. Compound gear unit 104 includes a power split planetary gear unit 105 and a motor speed reduction planetary gear unit 106. This example vehicle also includes front and rear drive motors 108, 112, an inverter with converter assembly 109, batteries 110, and a rear differential 115. Hybrid transaxle assembly 102 enables power from engine 101, motor 108, or both to be applied to front wheels 113 via front differential 103.

Inverter with converter assembly 109 inverts DC power from batteries 110 to create AC power to drive AC motors 108, 112. In embodiments where motors 108, 112 are DC motors, no inverter is required. Inverter with converter assembly 109 also accepts power from generator 107 (e.g., during engine charging) and uses this power to charge batteries 110.

The examples of FIGS. 1 and 2 are provided for illustration purposes only as examples of vehicle systems with which embodiments of the disclosed technology may be implemented. One of ordinary skill in the art reading this description will understand how the disclosed embodiments can be implemented with vehicle platforms.

Various embodiments of the present disclosure provide a system and method that can predict a vehicle's motion based on a dynamic model using derated tire cornering stiffness at lower speeds.

Cornering force or side force is a lateral (i.e., parallel to wheel axis) force produced by a vehicle tire during cornering. In some embodiments, the dynamic model considers lateral tire force as a linear function of tire slip angle, which is given by:

$$F_{fy}=C_f\alpha_f$$

$$F_{ry}=C_r\alpha_r$$

where $F_{fy}$ and $F_{ry}$ are the lateral forces of the front and rear tires, $C_f$ and $C_r$ are the cornering stiffnesses of the front and rear tires, and of $\alpha_f$ and $\alpha_r$ are slip angles of the front and rear tires. Slip angle describes the deformation of the tire contact patch, and this deflection of the contact patch deforms the tire in a fashion akin to a spring. As with deformation of a spring, deformation of the tire contact patch generates a reaction force in the tire, i.e., the cornering force.

Generally, tire cornering stiffness ($C_f$, $C_r$) is a constant value that is determined by testing the vehicle and performing measurements to determine tire cornering stiffness. However, as the vehicle approaches lower speeds, the tire cornering stiffness is derated. For example, assume that the tire cornering stiffness has a value of 100. When the vehicle is traveling greater than 5 mph, the dynamic model utilizes the value of 100 for the tire cornering stiffness. The value of 100 is merely an example but would be based on measurements performed by testing the vehicle to determine tire cornering stiffness. There is often a value used as the "nominal cornering stiffness". This value may be identified experimentally and held constant, or it may be updated over time because it will change based on weather, pavement type, tire inflation, wear, tire change, etc. The important point is that the nominal cornering stiffness is derated at lower speeds, even if the nominal value changes over time.

When the vehicle travels at lower speeds, the value of the tire cornering stiffness parameter is reduced. For example, when the vehicle approaches a predetermined minimum speed, for example, 5 miles per hour (mph) and continues to slow down to 0 mph, the tire cornering stiffness value will be reduced from the nominal cornering stiffness value, such as 100 at 5 mph to a predetermined lower value, such as 20 at 0 mph. Because the dynamic model begins to fail when values are set to zero, it is important that the tire cornering stiffness value stay above zero. In some embodiments, the reduction from the nominal cornering stiffness value (e.g., 100) to the lower value (e.g., 20) is linear. In other embodiments, the reduction may be non-linear.

It has been experimentally observed that derating the tire corner stiffness parameter at lower speeds results in more accurate predictions made by the dynamic model.

Figure 3:
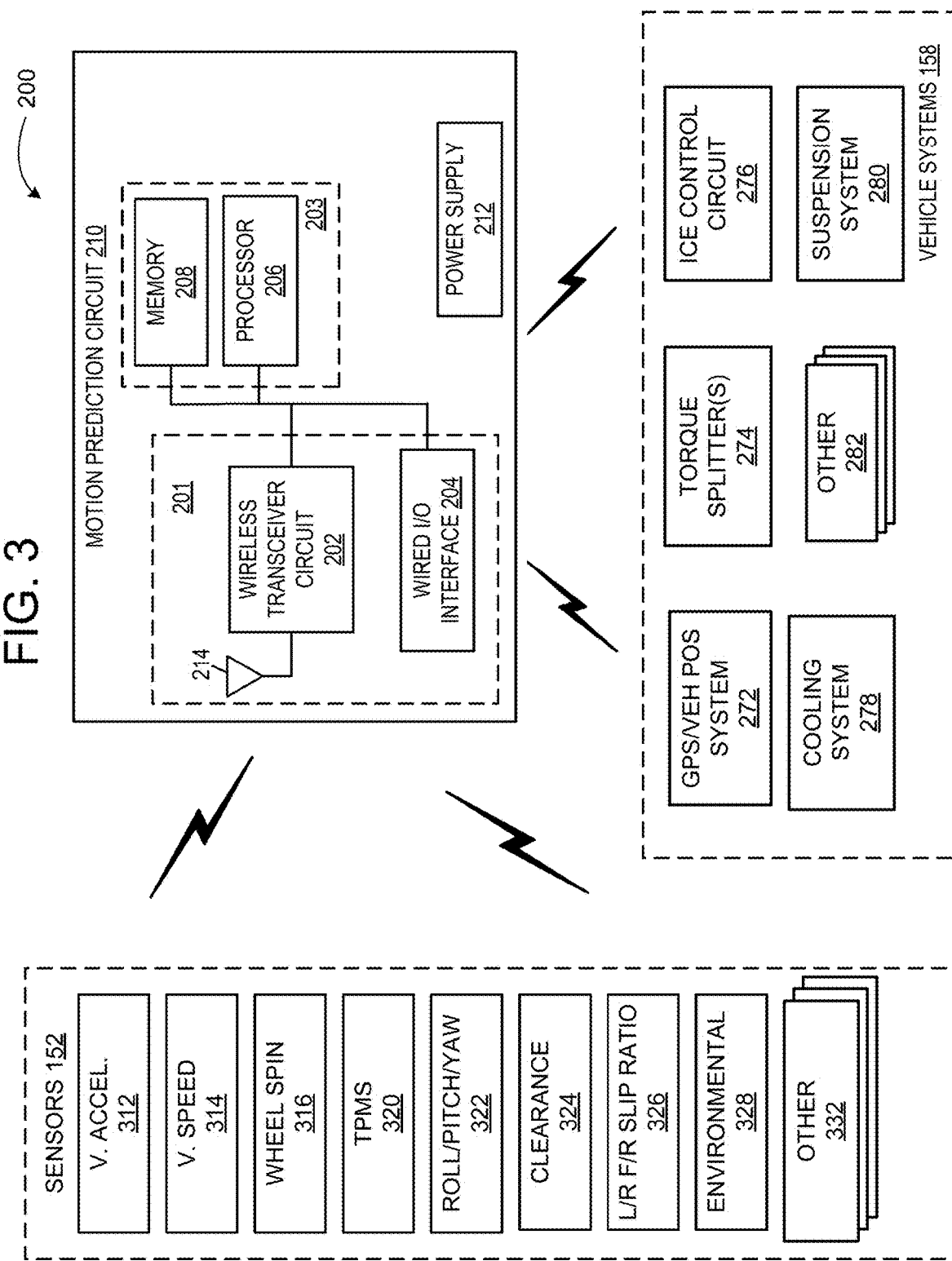
FIG. 3 illustrates an example architecture for predicting a vehicle's motion based on a dynamic model using derated tire cornering stiffness at lower speeds in accordance with one embodiment of the systems and methods described herein.

FIG. 3 illustrates an example architecture for predicting a vehicle's motion based on a dynamic model using derated tire cornering stiffness at lower speeds in accordance with one embodiment of the systems and methods described herein. Referring now to FIG. 3, in this example, vehicle motion prediction system 200 includes a motion prediction circuit 210, a plurality of sensors 152, and a plurality of vehicle systems 158. Sensors 152 and vehicle systems 158 can communicate with motion prediction circuit 210 via a wired or wireless communication interface. Although sensors 152 and vehicle systems 158 are depicted as communicating with motion prediction circuit 210, they can also communicate with each other as well as with other vehicle systems. Motion prediction circuit 210 can be implemented as an ECU or as part of an ECU such as, for example electronic control unit 50. In other embodiments, motion prediction circuit 210 can be implemented independently of the ECU.

Motion prediction circuit 210 in this example includes a communication circuit 201, a decision circuit (including a processor 206 and memory 208 in this example) and a power supply 212. Components of motion prediction circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the dynamic model parameters including nominal cornering stiffness values, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 in the motion prediction circuit 210 to execute a dynamic model software.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a motion prediction circuit 210.

Communication circuit 201 either or both a wireless transceiver circuit 202 with an associated antenna 214 and a wired I/O interface 204 with an associated hardwired data port (not illustrated). As this example illustrates, communications with motion prediction circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by motion prediction circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or not otherwise be included on a standard vehicle 10 with which the vehicle motion prediction system 200 is implemented. In the illustrated example, sensors 152 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, and environmental sensors 328 (e.g., to detect salinity or other environmental conditions). Additional sensors 332 can also be included as may be appropriate for a given implementation of vehicle motion prediction system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, motion prediction circuit 210 can receive information from various vehicle sensors, including the vehicle speed sensors 314, to determine the vehicle's various states. Communication circuit 201 can be used to transmit and receive information between motion prediction circuit 210 and sensors 152, and motion prediction circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining various states of the vehicle. Additionally, communication circuit 201 can be used to send an activation signal or other activation information to various vehicle systems 158 as part of the motion prediction. For example, as described in more detail below, communication circuit 201 can be used to send signals to, for example, one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 4:
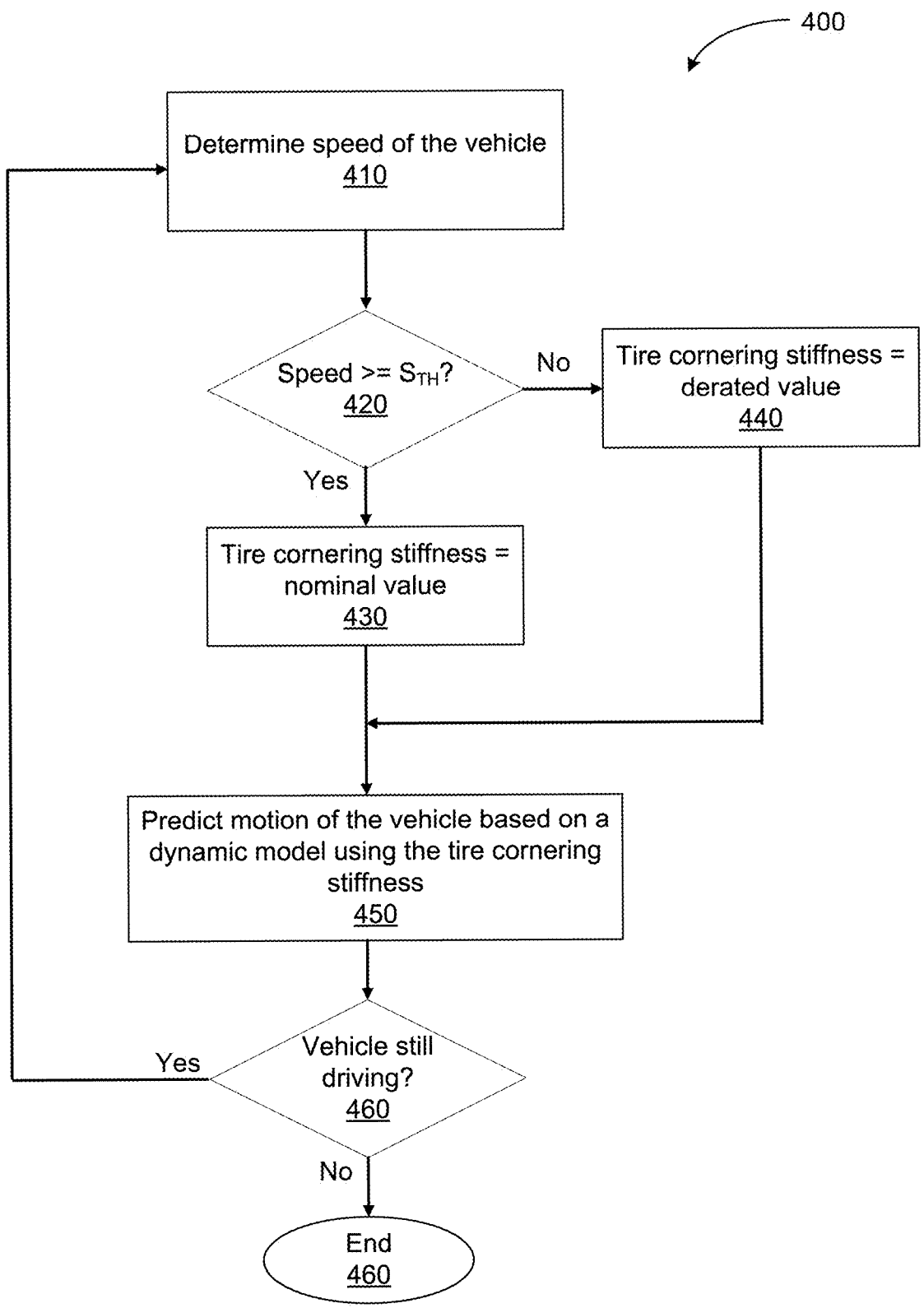
FIG. 4 illustrates an example process for predicting a vehicle's motion based on a dynamic model using derated tire cornering stiffness at lower speeds in accordance with one embodiment of the systems and methods described herein.

FIG. 4 illustrates an example process for predicting a vehicle's motion based on a dynamic model using derated cornering stiffness at lower speeds in accordance with one embodiment of the systems and methods described herein. The process 400 can be implemented in a program executed on a processor, such as the processor 206 in the vehicle motion prediction system 200 shown in FIG. 3.

The process 400 starts at state 410, where the vehicle's speed is determined. In some embodiments, the processor 206 in the vehicle motion prediction system 200 determines the speed from a signal received from one or more sensors capable of measuring the vehicle's speed, such as the vehicle speed sensors 314 shown in FIG. 3.

The process 400 proceeds to query state 420, where the speed is compared to a preset threshold speed ($S_{TH}$). In some embodiments, the threshold speed is set between 7 and 3 miles per hour (mph). In some embodiments, the threshold speed is set at about 5 mph.

If it is determined at query state 420 that the speed is greater than or equal to the threshold speed (Yes), the process 400 proceeds to state 430, where the tire cornering stiffness is set to a nominal value. In some embodiments, the nominal cornering stiffness value is retrieved from a memory, such as memory 208 shown in FIG. 3. In other embodiments, the nominal cornering stiffness value is calculated by the processor 206 using predefined function and related parameters and/or inputs from various sensors 152. In some embodiments, the nominal cornering stiffness value is a constant that is used for all vehicle speeds greater than the threshold speed. In other embodiments, the nominal cornering stiffness value can vary as a function of the vehicle speed.

If, on the other hand, it is determined at query state 420 that the vehicle speed is less than the threshold speed (No), the process 400 proceeds to state 440, where the processor 206 obtains a derated tire cornering stiffness value that is less than the nominal cornering stiffness value and sets the tire cornering stiffness to the derated value. In some embodiments, obtaining the derated tire cornering stiffness value involves decreasing the tire cornering stiffness value linearly from the nominal cornering stiffness value to a minimum cornering stiffness value as the speed decreases from the threshold speed (e.g., 5 mph) to 0 mph. In some embodiments, the derated tire cornering stiffness value is reduced up to 60% of the nominal cornering stiffness value as the vehicle speed is reduced from the threshold speed to 0 mph.

In some of such embodiments, the derated value is calculated using a function of the vehicle speed. In one embodiment, the following derating algorithm is implemented:

```
if (vx_LCp_C <= speed_breakpoint) {
    const double speed_interpolation = 1.0 - vx_LCp_C /
    speed_breakpoint;
    return (1.0 - derate_percentage * speed_interpolation) *
    default_cornering_stiffness;
} else {
    return default_cornering_stiffness;
}
``` where speed_breakpoint is set at 5.0 and derate_percentage is set at 0.6.

In other embodiments, derated values that correspond to various speed ranges are stored in memory 208 and are retrieved and used by the processor 206. For example, assuming the nominal stiffness value of 100, the stored derated values can be 85 between 5 and 3.75 mph, 70 between 3.75 and 2.5 mph, 55 between 2.5 and 1.25 mph, and 40 between 1.25 and 0 mph.

Following state 430 or 440, the process 400 proceeds to state 450, where the processor 206 executes a program implementing a dynamic model and predicts motion of the vehicle based on the model using either the nominal cornering stiffness value for Speed$>=S_{TH}$ or the derated cornering stiffness value for Speed$<S_{TH}$.

The process 400 proceeds to query state 460, where it is determined whether the vehicle is still driving. If the vehicle is still driving (Yes), the process 400 returns to state 410 and the process described above with respect to states 410-450 is repeated. If the vehicle is not driving (No), the process 400 ends at state 460.

Figure 5:
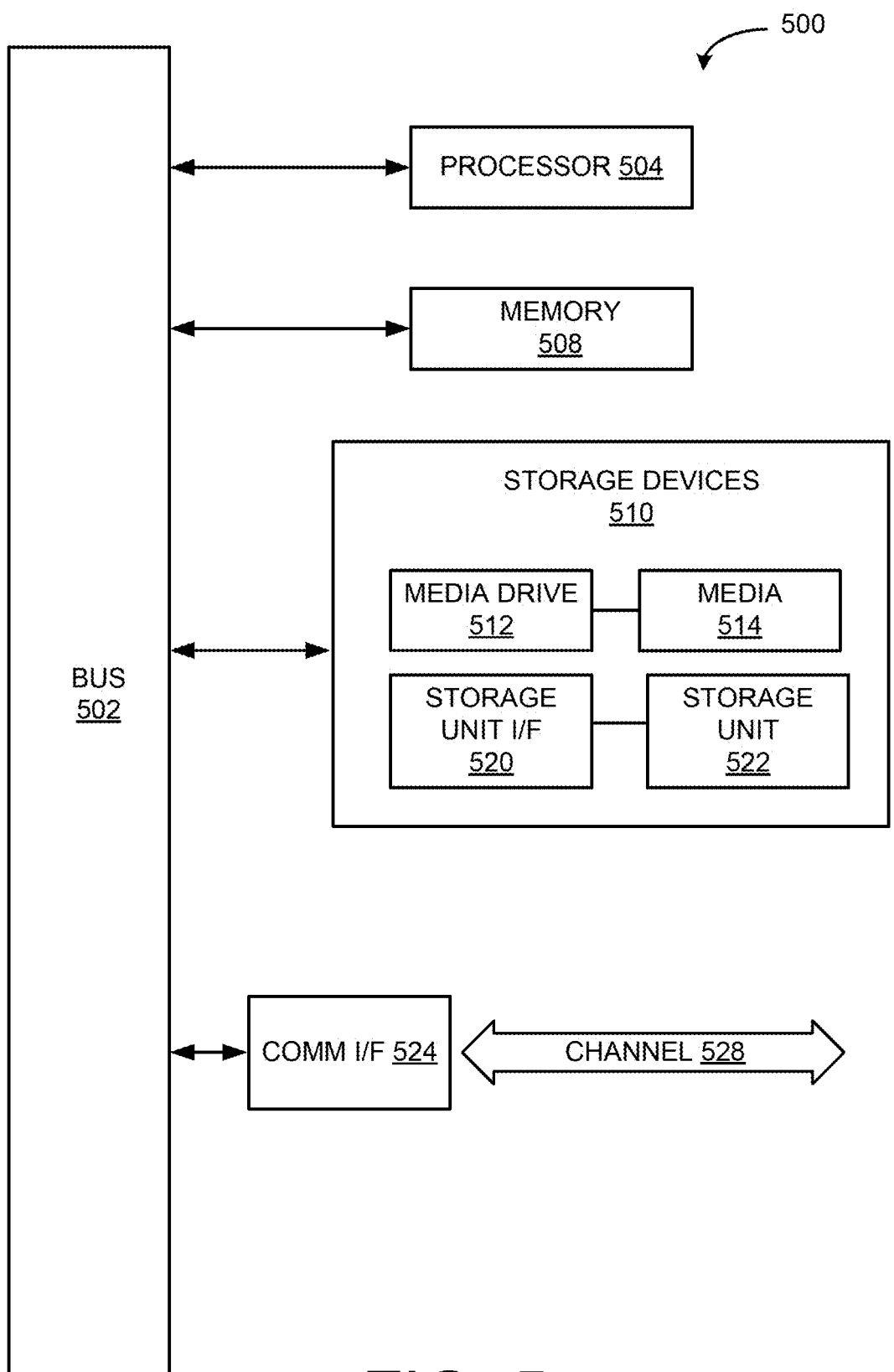
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up user device 102, user system 104, and non-decrypting cloud service 106. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle motion prediction system comprising:
    a vehicle speed sensor configured to measure a speed of a vehicle; and
    a processor configured to:
        receive a signal indicative of the speed from the vehicle speed sensor,
        determine the speed from the signal,
        obtain a derated tire cornering stiffness value that is less than a nominal cornering stiffness value if the speed is below a threshold speed, and
        determine a motion of the vehicle based on a dynamic model using the derated tire cornering stiffness value.

2. The vehicle motion prediction system of claim 1, wherein the dynamic model considers lateral tire forces given by:

$$F_{fy}=C_f\alpha_f$$

$$F_{ry}=C_r\alpha_r$$

where $F_{fy}$ and $F_{ry}$ are lateral forces of front and rear tires, $C_f$ and $C_r$ are cornering stiffness values of the front and rear tires, and $\alpha_f$ and $\alpha_r$ are slip angles of the front and rear tires.

3. The vehicle motion prediction system of claim 1, wherein the processor is further configured to:
    determine the nominal cornering stiffness value of the vehicle; and
    determine the motion of the vehicle based on the dynamic model using the nominal cornering stiffness value if the speed is equal to or above the threshold speed.

4. The vehicle motion prediction system of claim 1, further comprising a memory for storing the nominal cornering stiffness value and the threshold speed.

5. The vehicle motion prediction system of claim 1, wherein the derated tire cornering stiffness value decreases linearly from the nominal cornering stiffness value to a minimum cornering stiffness value as the speed decreases from the threshold speed to 0 miles per hour (mph).

6. The vehicle motion prediction system of claim 1, wherein the threshold speed is about 5 miles per hour.

7. The vehicle motion prediction system of claim 1, the derated tire cornering stiffness value is reduced to 40% of the nominal cornering stiffness value when the speed is reduced to 0 mph.

8. The vehicle motion prediction system of claim 1, wherein the nominal cornering stiffness value is tested for the vehicle according to vehicle parameters and is determined to remain constant.

9. The vehicle motion prediction system of claim 1, wherein the nominal cornering stiffness value is updated over time.

10. A method for predicting a motion of a vehicle, the method comprising:
    receiving a signal indicative of a speed of the vehicle from a vehicle speed sensor;
    determining the speed from the signal;
    determining that the speed is below a threshold speed;
    in response to determining the speed is below the threshold speed, obtaining a derated tire cornering stiffness value that is less than a nominal cornering stiffness value; and
    determining the motion of the vehicle based on a dynamic model using the derated tire cornering stiffness value.

11. The method of claim 10, further comprising:
    determining the nominal cornering stiffness value of the vehicle; and
    determining the motion of the vehicle based on the dynamic model using the nominal cornering stiffness value if the speed is equal to or above the threshold speed.

12. The method of claim 10, further comprising storing the nominal cornering stiffness value and the threshold speed in a memory.

13. The method of claim 10, wherein the obtaining the derated tire cornering stiffness value comprises decreasing the nominal cornering stiffness value linearly to a minimum cornering stiffness value as the speed decreases from the threshold speed to 0 miles per hour (mph).

14. The method of claim 10, wherein the derated tire cornering stiffness value is reduced to 40% of the nominal cornering stiffness value when the speed is reduced to 0 mph.

15. The method of claim 10, wherein the threshold speed is about 5 miles per hour.

16. The method of claim 10, wherein the nominal cornering stiffness value is constant.

17. The method of claim 10, wherein the nominal cornering stiffness value is tested for the vehicle according to vehicle parameters and is determined to remains constant.

18. The method of claim 10, wherein the nominal cornering stiffness value is updated over time.

19. The vehicle motion prediction system of claim 1, wherein the nominal cornering stiffness value is constant.

20. The method of claim 10, wherein the dynamic model considers lateral tire forces given by:

$$F_{fy}=C_f\alpha_f$$

$$F_{ry}=C_r\alpha_r$$

where $F_{fy}$ and $F_{ry}$ are lateral forces of front and rear tires, $C_f$ and $C_r$ are cornering stiffness values of the front and rear tires, and $\alpha_f$ and $\alpha_r$ are slip angles of the front and rear tires.

* * * * *

UNITED STATES PATENT AND TRADEMARK OFFICE
CERTIFICATE OF CORRECTION

PATENT NO. : 12,060,068 B2
APPLICATION NO. : 17/732369
DATED : August 13, 2024
INVENTOR(S) : Carrie G. Bobier-Tiu Page 1 of 1

It is certified that error appears in the above-identified patent and that said Letters Patent is hereby corrected as shown below:

In the Claims

In Claim 17, Column 14, Lines 43-45:
"The method of claim 10, wherein the nominal cornering stiffness value is tested for the vehicle according to vehicle parameters and is determined to remains constant."

Should read:
-- The method of claim 10, wherein the nominal cornering stiffness value is tested for the vehicle according to vehicle parameters and is determined to remain constant. --

Signed and Sealed this
Eleventh Day of February, 2025

Coke Morgan Stewart
*Acting Director of the United States Patent and Trademark Office*